(12) United States Patent
Rautschek et al.

(10) Patent No.: US 10,577,742 B2
(45) Date of Patent: Mar. 3, 2020

(54) METHOD FOR IMPREGNATING TEXTILES WITH COMPOSITIONS CONTAINING ALKOXYPOLYSILOXANE

(71) Applicant: Wacker Chemie AG, Munich (DE)

(72) Inventors: Holger Rautschek, Nuenchritz (DE); Anton Heller, Simbach (DE); Wolfgang Ziche, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 190 days.

(21) Appl. No.: 15/568,153

(22) PCT Filed: Nov. 3, 2016

(86) PCT No.: PCT/EP2016/076483
§ 371 (c)(1),
(2) Date: Oct. 20, 2017

(87) PCT Pub. No.: WO2017/080894
PCT Pub. Date: May 18, 2017

(65) Prior Publication Data
US 2018/0148889 A1    May 31, 2018

(30) Foreign Application Priority Data

Nov. 10, 2015 (DE) .................. 10 2015 222 139

(51) Int. Cl.
*C08L 83/04* (2006.01)
*D06M 15/647* (2006.01)
*C08G 77/18* (2006.01)

(52) U.S. Cl.
CPC ........... *D06M 15/647* (2013.01); *C08G 77/18* (2013.01); *C08L 83/04* (2013.01); *D06M 2200/12* (2013.01)

(58) Field of Classification Search
None
See application file for complete search history.

(56) References Cited

U.S. PATENT DOCUMENTS

| 3,354,101 A * | 11/1967 | Omietanski | C07F 7/0876 524/413 |
| 3,450,792 A * | 6/1969 | Sekmakas | C08G 18/42 523/511 |
| 3,661,964 A * | 5/1972 | Griffiths | C08G 77/388 528/15 |
| 4,036,868 A * | 7/1977 | Atherton | C08G 77/388 556/410 |
| 4,070,152 A | 1/1978 | Pentz | |
| 4,987,155 A | 1/1991 | Inoue et al. | |
| 5,074,912 A | 12/1991 | Liles et al. | |
| 5,147,965 A * | 9/1992 | Ichinohe | A61K 8/893 528/12 |
| 5,216,037 A | 6/1993 | Miyoshi et al. | |
| 6,136,938 A * | 10/2000 | Halloran | C08G 77/26 528/14 |
| 6,140,447 A * | 10/2000 | Gay | C07F 7/21 528/15 |
| 6,271,331 B1 * | 8/2001 | Gay | C07F 7/21 528/15 |
| 6,323,268 B1 * | 11/2001 | Fisher | C04B 41/009 106/2 |
| 6,359,097 B1 | 3/2002 | Jost et al. | |
| 2003/0155547 A1 | 8/2003 | Ludemann et al. | |
| 2003/0180624 A1 | 9/2003 | Oh et al. | |
| 2004/0186260 A1 * | 9/2004 | Hohenberg | C08G 77/08 528/25 |
| 2009/0206296 A1 | 8/2009 | Dave | |
| 2010/0075159 A1 * | 3/2010 | Osawa | C08J 3/03 428/447 |

FOREIGN PATENT DOCUMENTS

| EP | 1217119 B1 | 4/2004 |
| EP | 1687359 B1 | 8/2010 |
| GB | 766864 A | 1/1957 |
| JP | 4255759 A2 | 9/1992 |
| JP | 3086259 B2 | 9/2000 |
| JP | 2002212883 A2 | 7/2002 |
| JP | 2004067561 | 3/2004 |
| WO | 04018758 A2 | 3/2004 |
| WO | 14099497 A2 | 6/2014 |

OTHER PUBLICATIONS

Odvarka, J., Dembicky, J., Wiener, J., Kovacic, V., Textile Faculty, Technical University of Liberec, Liberec, Czech Rep., Vlakna a Textil, 9(2), 58-69, 2002.
Ramaszeder, K., Textilveredlung 1995, 30 (11/12), 256-62.
Titvinidze et al., Oxidation Communications 37 (2014), 372.
Journal of Colloid and Interface Science 298 (2006), 441-450.

* cited by examiner

Primary Examiner — Robert S Loewe
(74) Attorney, Agent, or Firm — Brooks Kushman P.C.

(57) ABSTRACT

Textile fabrics are rendered water repellent yet breathable by impregnating with an organopolysiloxanes of the formula $$R^1{}_3SiO[SiR^1(OR^2)O]_x[SiR^1{}_2O]_y[SiR^1R^3O]_zSiR^1{}_3 \quad (I).$$

6 Claims, No Drawings

METHOD FOR IMPREGNATING TEXTILES WITH COMPOSITIONS CONTAINING ALKOXYPOLYSILOXANE

CROSS REFERENCE TO RELATED APPLICATIONS

This application is the U.S. National Phase of PCT Appln. No. PCT/EP2016/076483 filed Nov. 3, 2016, which claims priority to German Application No. 10 2015 222 139.3 filed Nov. 10, 2015, the disclosures of which are incorporated in their entirety by reference herein.

BACKGROUND OF THE INVENTION

1. Field of the Invention

The invention concerns methods for impregnating textiles with compositions comprising alkoxypolysiloxanes and also alkoxypolysiloxanes having comparatively long alkyl moieties.

2. Description of the Related Art

Textiles are employed in different sectors, as industrial textiles, for tents and awnings and especially for apparel. Textiles exposed to the weather, rainwear for example, need to be impermeable to water and also nonabsorbent. With apparel, the particular desire is that the textiles—while being water-repellent—should nonetheless remain sufficiently breathable, i.e., not be sealed shut by an uninterrupted film of polymer. Water-resistant treatment may utilize mixtures of paraffin with zirconium soaps. These do produce a very high contact angle, but the effect is distinctly worse after laundering or dry cleaning (Odvarka, J., Dembicky, J., Wiener, J., Kovacic, V., Textile Faculty, Technical University of Liberec, Liberec, Czech Rep., Vlakna a Textil, 9(2), 58-69, 2002). Emulsions of siloxanes having Si—H groups are advantageous in that respect (Ramaszeder, K., Textilveredlung 1995, 30 (11/12), 256-62). These siloxanes, however, have the disadvantage of evolving hydrogen in use and of thus representing a safety risk.

Fluorocarbons have therefore become established in recent decades as water-resistant treatments (e.g. U.S. Pat. No. 4,070,152 A, EP 1 687 359 B1), but these products are suspect for reasons of environmental protection, since some raw materials and breakdown products may persist in the environment.

Owing to these environmental concerns and their high costs, formulations with fluorine-containing silanes and siloxanes (e.g., EP 1 217 119 B1 and WO 04/018758 A2) are also not attractive.

The application of hydrolyzable silanes is technologically too burdensome to find wide application (e.g., US 2009/0206296 A1).

The problem addressed by the invention was therefore that of providing a method for impregnating textiles with compositions comprising organopolysiloxanes which are capable of impregnating different textiles in an outstandingly and durably water-repellent manner while maintaining their breathability, which do not evolve hydrogen in application and which are environmentally friendly.

These problems are solved by the invention.

SUMMARY OF THE INVENTION

The invention thus provides a method for providing water repellant textiles, by impregnating textiles with a composition comprising alkoxypolysiloxanes (A) of the formula $$R^1{}_3SiO[SiR^1(OR^2)O]_x[SiR^1{}_2O]_y[SiR^1R^3O]_zSiR^1{}_3 \qquad (I)$$

where
$R^1$ each individually is an optionally substituted a $C_1$-$C_7$ hydrocarbon moiety,
$R^2$ each individually is hydrogen or a $C_1$-$C_6$ hydrocarbon moiety,
$R^3$ each individually is a $C_8$-$C_{30}$ hydrocarbon moiety,
x is an integer of not less than 1, and
  not more than 1,000,
y is an integer of not less than 0 and not more than 100,
z is an integer of not less than 0, and
  not more than 1,000,
with the provisos that:
x units $[SiR^1(OR^2)O]$ are present in amounts of
  not less than 10 mol %, preferably not less than 30 mol %, and
  not more than 100 mol %, preferably not more than 70 mol %,
y units $[SiR^1{}_2O]$ are present in amounts of
  not less than 0 mol % and not more than 90 mol %,
  preferably not more than 50 mol %, and
z units $[SiR^1R^3O]$ are present in amounts of
  not less than 0 mol %, preferably not less than 20 mol %, and
  not more than 90 mol %, preferably not more than 70 mol %,
all based on the x+y+z sum total of siloxane units.

DETAILED DESCRIPTION OF THE PREFERRED EMBODIMENTS

The invention thus provides a method for providing water repellant textiles, by impregnating textiles with a composition comprising alkoxypolysiloxanes (A) of the formula $$R^1{}_3SiO[SiR^1(OR^2)O]_x[SiR^1{}_2O]_y[SiR^1R^3O]_zSiR^1{}_3 \qquad (I)$$

where
$R^1$ each individually is an optionally substituted a $C_1$-$C_7$ hydrocarbon moiety,
$R^2$ each individually is hydrogen or a $C_1$-$C_6$ hydrocarbon moiety,
$R^3$ each individually is a $C_8$-$C_{30}$ hydrocarbon moiety,
x is an integer of not less than 1, preferably not less than 5, more preferably not less than 10 and
  not more than 1,000, preferably not more than 100, more preferably not more than 50,
y is an integer of not less than 0 and not more than 100, preferably not more than 50, more preferably not more than 10,
z is an integer of not less than 0, preferably not less than 5, more preferably not less than 10, and
  not more than 1,000, preferably not more than 100, more preferably not more than 50,
with the provisos that:
x units $[SiR^1(OR^2)O]$ are present in amounts of
  not less than 10 mol %, preferably not less than 30 mol %, and
  not more than 100 mol %, preferably not more than 70 mol %,
y units $[SiR^1{}_2O]$ are present in amounts of
  not less than 0 mol % and not more than 90 mol %,
  preferably not more than 50 mol %, and z units [SiR¹R³O] are present in amounts of
  not less than 0 mol %, preferably not less than 20 mol %, and
  not more than 90 mol %, preferably not more than 70 mol %,
all based on the x+y+z sum total of siloxane units.

Preference for use as alkoxypolysiloxanes (A) is given to those of formula (I) where in each of which y represents the value 0 and z represents an integer of not less than 1.

Preference for use as alkoxypolysiloxanes (A) is therefore given to those of the formula $$R^1_3SiO[SiR^1(OR^2)O]_{x'}[SiR^1R^3O]_{z'}SiR^1_3 \quad (II)$$

where
$R^1$, $R^2$ and $R^3$ are each as defined above,
x' represents an integer of not less than 1, preferably not less than 5, more preferably not less than 10, and
  not more than 1,000, preferably not more than 100, more preferably not more than 50,
z' represents an integer of not less than 1, preferably not less than 5, more preferably not less than 10, and
  not more than 1,000, preferably not more than 100, more preferably not more than 50,
with the proviso that there are present
x' units [SiR¹(OR²)O] in amounts of
  not less than 10 mol %, preferably not less than 20 mol %, more preferably not less than 30 mol %, and
  not more than 95 mol %, preferably not more than 80 mol %, more preferably not more than 70 mol %,
z' units [SiR¹R³O] in amounts of not less than 5 mol %, preferably not less than 20 mol %, more preferably not less than 30 mol %, and
  not more than 90 mol %, preferably not more than 80 mol %, more preferably not more than 70 mol %,
all based on the x'+z' sum total of siloxane units.

The invention accordingly provides compositions comprising alkoxypolysiloxanes (A) of the formula $$R^1_3SiO[SiR^1(OR^2)O]_{x'}[SiR^1R^3O]_{z'}SiR^1_3 \quad (II)$$

where
$R^1$, $R^2$ and $R^3$ are each as defined above,
x' represents an integer of not less than 1, preferably not less than 5, more preferably not less than 10, and
  not more than 1,000, preferably not more than 100, more preferably not more than 50,
z' represents an integer of not less than 1, preferably not less than 5, more preferably not less than 10, and
  not more than 1,000, preferably not more than 100, more preferably not more than 50,
with the proviso that there are present
x' units [SiR¹(OR²)O] in amounts of
  not less than 10 mol %, preferably not less than 20 mol %, more preferably not less than 30 mol %, and
  not more than 95 mol %, preferably not more than 80 mol %, more preferably not more than 70 mol %,
z' units [SiR¹R³O] in amounts of
  not less than 5 mol %, preferably not less than 20 mol %, more preferably not less than 30 mol %, and
  not more than 90 mol %, preferably not more than 80 mol %, more preferably not more than 70 mol %,
all based on the x'+z' sum total of siloxane units.

The alkoxypolysiloxanes (A) of formulae (I) and (II) may comprise up to 10 mol %, preferably up to 5 mol %, of units of the formula $R^1SiO_{3/2}$ and up to 10 mol %, preferably up to 5 mol %, of terminal siloxane units having Si-bonded groups of the formula —O—R², where $R^1$ and $R^2$ are each as defined above. These siloxane units are usually formed in the course of the synthesis of the alkoxypolysiloxanes (A) by side reactions which are unwanted but are largely unavoidable.

The alkoxypolysiloxane used as alkoxypolysiloxane (A) may be one alkoxypolysiloxane or a mixture of two or more alkoxypolysiloxanes.

The alkoxypolysiloxane or the mixture of alkoxypolysiloxanes (A) is preferably liquid at 25° C. and preferably has a viscosity of 10 to 100,000 mPa·s (25° C.), more preferably of 100 to 10,000 mPa·s (25° C.), or (a) solid substance(s) preferably having a melting point of preferably 30-100° C., more preferably 30-70° C.

Examples of hydrocarbon moieties $R^1$ having 1 to 7 carbon atoms are alkyl moieties such as methyl, ethyl, n-propyl, isopropyl, 1-n-butyl, 2-n-butyl, isobutyl, tert-butyl, n-pentyl, isopentyl, neopentyl, tert-pentyl; hexyl moieties such as n-hexyl; heptyl moieties such as n-heptyl; cycloalkyl moieties, such as cyclopentyl, cyclohexyl, cycloheptyl and methylcyclohexyl; alkenyl moieties such as vinyl, 1-propenyl and 2-propenyl; aryl moieties such as the phenyl moiety; alkaryl moieties such as the o-, m-, p-tolyl moieties; and aralkyl moieties such as the benzyl moiety.

Examples of substituted moieties $R^1$ are moieties substituted with halogen, cyano, glycidoxy, polyalkylene glycol or amino groups, for example trifluoropropyl, cyanoethyl, glycidoxypropyl, polyalkylene glycol propyl and amino-bearing hydrocarbon moieties.

The moiety $R^1$ is preferably a hydrocarbon moiety having 1 to 4 carbon atoms or a phenyl moiety, preferably a $C_1$-$C_4$ alkyl moiety or a phenyl moiety, more preferably a methyl moiety.

Examples of moieties $R^2$ are hydrogen and alkyl moieties of 1-6 carbon atoms, preferably 2-4 carbon atoms.

Preference for use as $R^3$ moieties is given to hydrocarbon moieties having 10 to 20 carbon atoms.

Examples of moieties $R^3$ are alkyl moieties of 12 to 18 carbon atoms, such as i-dodecyl, n-dodecyl, n-tetradecyl, n-hexadecyl and n-octadecyl moieties.

The alkoxypolysiloxanes (A) are prepared by known methods, for example as described in US 2003/0180624 A, JP 2004067561 A, WO 2014/099497 A2 or in Titvinidze et al., Oxidation Communications 37 (2014), 372.

The compositions of the invention may comprise further constituents in addition to the alkoxypolysiloxanes (A). Examples of further constituents are emulsifiers (B), water (C), catalysts (D), organic solvents (E) and further components (F).

Useful catalysts (D) include any known catalysts that promote the hydrolysis and/or condensation of alkoxysiloxanes, preferably alkali hydroxides, amines, guanidines and compounds of tin, zinc, zirconium or titanium.

Catalysts (D) are preferably used in an amount of 0.01 to 1 part per 100 parts of alkoxypolysiloxanes (A). The catalysts are preferably only added at the time of application.

In one embodiment of the invention, the alkoxypolysiloxanes (A) of the invention are solutes in organic solvents (E). The solutions may comprise catalysts (D).

Typical examples of organic solvents (E) for the alkoxypolysiloxanes (A) used according to the invention are hydrocarbons such as pentane, n-hexane, hexane isomer mixtures, heptane, octane, naphtha, petroleum ether, benzene, toluene and xylenes; halogenated hydrocarbons such as dichloromethane, trichloromethane, tetrachloromethane, 1,2-dichloroethane and trichloroethylene; alcohols such as methanol, ethanol, n-propanol, isopropanol, n-amyl alcohol and i-amyl alcohol; ketones such as acetone, methyl ethyl ketone, diisopropyl ketone and methyl isobutyl ketone (MIBK); esters such as ethyl acetate, butyl acetate, propyl propionate, ethyl butyrate and ethyl isobutyrate; ethers such as tetrahydrofuran, diethyl ether, diisopropyl ether and diethylene glycol dimethyl ether; or mixtures thereof.

When organic solvents (E) are used, they are preferably used in an amount of 100 to 10,000 parts by weight per 100 parts by weight of alkoxypolysiloxanes (A).

In a further embodiment of the invention, the compositions of the invention are aqueous emulsions comprising alkoxypolysiloxanes (A) of the invention, emulsifiers (B) and water (C).

Emulsifiers (B) are preferably used in amounts of 1 to 60 parts by weight, more preferably 2 to 30 parts by weight, all based on 100 parts by weight of alkoxypolysiloxanes (A).

All known types of emulsifiers are usable in the method of the invention. They include, for example, anionic, cationic, nonionic and amphoteric emulsifiers, protective colloids and particles that stabilize emulsions.

With the constituent (B) of the emulsions, commercially available emulsifiers are preferably used, for example sorbitan esters of fatty acids having 10 to 22 carbon atoms; polyoxyethylene sorbitan esters of fatty acids having 10 to 22 carbon atoms and an ethylene oxide content of up to 35 percent; polyoxyethylene sorbitol esters of fatty acids having 10 to 22 carbon atoms; polyoxyethylene derivatives of phenols having 6 to 20 carbon atoms on the aromatic and an ethylene oxide content of up to 95 percent; amidobetains and fatty amino betains having 10 to 22 carbon atoms; polyoxyethylene condensates of fatty acids or fatty alcohols having 8 to 22 carbon atoms and an ethylene oxide content of up to 95 percent; ionic emulsifiers, such as alkylarylsulfonates having 6 to 20 carbon atoms in the alkyl group; fatty acid soaps having 8 to 22 carbon atoms; fatty sulfates having 8 to 22 carbon atoms; alkylsulfonates having 10 to 22 carbon atoms; alkali metal salts of dialkyl sulfosuccinates; fatty amine oxides having 10 to 22 carbon atoms; fatty imidazolines having 6 to 20 carbon atoms; fatty amidosulfobetains having 10 to 22 carbon atoms; quaternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 percent of ethylene oxide; ethylene oxide condensates of fatty acid monoesters of glycerol having 10 to 22 carbon atoms and up to 95 percent of ethylene oxide; mono- or diethanolamides of fatty acids having 10 to 22 carbon atoms; alkoxylated silicone emulsifiers having ethylene oxide units and/or propylene oxide units; alkyl phosphates and salts thereof.

As is well known in the field of emulsifiers, the counterions in the case of anionic emulsifiers may be alkali metal ions, ammonium ions of ammonia or of substituted amines, such as trimethylamine or triethanolamine. Ammonium, sodium and potassium ions are normally preferable. In the case of cationic emulsifiers, the counterion is preferably a halide, sulfate or methosulfate. Chlorides are usually the compounds which are industrially available.

Examples of emulsifiers are decylaminobetaine; cocoamidosulfobetaine; oleylamidobetaine; cocoimidazoline; cocosulfoimidazoline; cetylimidazoline; 1-hydroxyethyl-2-heptadecenyl-imidazoline; n-cocomorpholine oxide; decyldimethyl-amine oxide; cocoamidodimethylamine oxide; sorbitan tristearate having condensed groups of ethylene oxide; sorbitan trioleate having condensed groups of ethylene oxide; sodium or potassium dodecylsulfate; sodium or potassium stearylsulfate; sodium or potassium dodecylbenzenesulfonate; sodium or potassium stearylsulfonate; triethanolamine salt of dodecylsulfate; trimethyldodecylammonium chloride; trimethylstearylammonium methosulfate; sodium laurate; sodium or potassium myristate, di-n-butyl phosphate, di-n-hexyl phosphate, mono-n-octyl phosphate, di-n-octyl phosphate, mono-2-ethylhexyl phosphate, di-2-ethylhexyl phosphate, mono-i-nonyl phosphate, di-i-nonyl phosphate, mono-n-decyl phosphate, n-octyl n-decyl phosphate, di-n-decyl phosphate, monoisotridecyl phosphate, di-n-nonyl phenyl phosphate, monooleyl phosphate and distearyl phosphate; mono-n-octyl phosphate, di-n-octyl phosphate, mono-n-decyl phosphate, n-octyl n-decyl phosphate, di-n-decyl phosphate, ethoxylated castor oil having 200 ethylene glycol units, ethoxylated castor oil having 40 ethylene glycol units and ethoxylated hydrogenated castor oil having 200 ethylene glycol units, polyoxyethylene(20) sorbitan stearate (Polysorbate 60), Polyoxyethylene(20)sorbitan tristearate (Polysorbate 65), Polyoxyethylene(20)sorbitan oleate (Polysorbate 80) and Polyoxyethylene(20) sorbitan laurate (Polysorbate 20), compounds of the formula i-$C_{13}H_{27}$—O—$(CH_2CH_2O)_{10}$—H, $C_{16}H_{33}$—O—$(CH_2CH_2O)_4$—H, $C_{16}H_{33}$—O—$(CH_2CH_2O)_{20}$—H, $C_{16}H_{33}$—O—$(CH_2CH_2O)_{25}$—H, $C_{18}H_{37}$—O—$(CH_2CH_2O)_4$—H, $C_{18}H_{37}$—O—$(CH_2CH_2O)_{20}$—H, $C_{18}H_{37}$—O—$(CH_2CH_2O)_{25}$—H, $C_{18}H_{35}$—O—$(CH_2CH_2O)_{20}$—H, $C_{12}H_{23}$—O—$(CH_2CH_2O)_4$—H, $C_{12}H_{23}$—O—$(CH_2CH_2O)_{23}$—H, $C_{16}H_{33}$—$CH_2C(O)$—O—$(CH_2CH_2O)_{20}$—H, $C_{16}H_{33}CH_2C(O)$—O—$(CH_2CH_2O)_{30}$—H, $C_{16}H_{33}$—$CH_2C(O)$—O—$(CH_2CH_2O)_{40}$—H and $C_{16}H_{33}CH_2C(O)$—O—$(CH_2CH_2O)_{100}$—H.

The constituent (B) may consist of one emulsifier or of a mixture of two or more emulsifiers.

In one preferred embodiment, component (B) comprises more than 50 wt % of nonionic emulsifiers and more preferably comprises more than 75 wt % of nonionic emulsifiers.

The nonionic emulsifiers (B) included in the emulsions of the invention preferably have an average HLB value of 10 to 17, preferably 11 to 15.

The HLB value indicates the balance between hydrophilic and hydrophobic groups of an emulsifier. The definition of the HLB value and also methods for quantifying it are known to a person skilled in the art and are for example described in the Journal of Colloid and Interface Science 298 (2006), 441-450 and also the literature cited therein, especially citation [23].

Useful emulsifying protective colloids include, for example, polyvinyl alcohols and also cellulose ethers, such as methylcellulose, hydroxyethylcellulose and carboxymethylcellulose.

Useful particles for stabilizing emulsions include, for example, partially hydrophobed colloidal silicas.

In addition to components (A), (B), (C), (D) and (E), it is possible to use any further substances (F) customarily added to silicone emulsions, examples being further siloxanes other than alkoxypolysiloxanes (A), e.g., polyether siloxanes, silanes, especially alkoxysilanes, thickeners and/or protective colloids, fillers and also additives, for example preservatives, disinfectants, wetting agents, corrosion inhibitors, dyes and scents.

When the method of the invention utilizes thickeners and/or protective colloids as component (F) in addition to emulsifier (B), these are preferably acrylic acid copolymers, cellulose ethers and polysaccharides, e.g., xanthan gum.

When thickeners and/or protective colloids (F) are used, the amounts are preferably 0.01 to 2 parts by weight, based on 100 parts by weight of alkoxypolysiloxanes (A).

Examples of additives (F) which are usable according to the invention include, for example, conventional preservatives, dyes/scents, especially preservatives such as methylisothiazolinone, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butyl carbamate, benzyl alcohol and 2-bromo-2-nitropropane-1,3-diol.

When additives (F) are used, the amounts are preferably 0.0005 to 2 parts by weight, based on 100 parts by weight of alkoxypolysiloxanes (A). The method of the invention does preferably utilize additives (F), especially preservatives.

The emulsions of the invention preferably have a nonvolatile content, as measured to DIN EN ISO 3251, of 1 to 80 wt %, more preferably of 30 to 70 wt %.

The pH of emulsions according to the invention is preferably in the range of from 3 to 10, and more preferably in the range of from 6 to 8.

As water (C) there may be used any type of water as hitherto also used to prepare emulsions. As water (C) there is preferably used partially or completely ion-free water, distilled or (repeatedly) redistilled water, water for medical or pharmaceutical purposes, for example purified water (Aqua purificata as per Pharm. Eur.).

Water (C) as used in the invention preferably has a conductivity of less than 50 µS/cm, more preferably less than 10 µS/cm, most preferably less than 1.3 µS/cm, all at 25° C. and 1010 hPa.

Useful mixing and homogenizing tools to prepare the compositions of the invention in the form of an aqueous emulsion include any conventional emulsifying devices, for example high-speed stirrers, dissolver disks, rotor-stator homogenizers, ultrasonic homogenizers and high-pressure homogenizers in various designs. When large particles are desired, slow-speed stirrers are also suitable.

The process for preparing the compositions of the invention in the form of an aqueous emulsion may be operated on a continuous basis, on a semi-continuous basis or on a batch basis.

To prepare the compositions of the invention in the form of an aqueous emulsion, all the components may be mixed together by stirring and/or homogenizing, for example in any desired order, in which case the circumferential speed of the stirrer and/or rotor-stator homogenizer is preferably above 5 m/s, more preferably above 10 m/s and especially in the range from 5 to 50 m/s.

The compositions of the invention in the form of aqueous emulsions comprising components (A), (B), (C) and optionally (F) are preferably prepared by first mixing some of component (C) with the other components to form a highly viscous, nonfluent paste. It is particularly preferable for the yield limit (corresponding to DIN 53019-1 and standards cited therein) of this pasty premix to be greater than 100 Pa (25° C.), especially greater than 1000 Pa (25° C.). This pasty premix is preferably then homogenized by action of shearing energy until the desired particle size is attained and diluted with water (C) under stirring and/or homogenizing to form a fluent emulsion.

The emulsion of the invention preferably comprises more than 50 parts by weight, more preferably comprises from 50 to 1000 parts by weight and yet more preferably comprises from 80 to 500 parts by weight of water (C), all based on 100 parts by weight of component (A).

Examples of textiles are natural or synthetically produced fibers, yarns, webs, matts, skeins, woven, knotted or knitted textiles. The textiles may be present as individual fibers, fiber bundles, fiberfill fibers, yarns, carpets, fabric webs or garments or parts of garments.

The textiles may consist of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose or mixtures thereof.

Application to the textiles to be treated may be effected in any desired manner suitable and extensively used for the treatment of textiles, e.g., by dipping, spreading, casting, spraying, rolling, padding, printing or foam application.

The treated textiles are preferably dried at temperatures of 10° C. to 250° C., preferably 25 to 200° C., more preferably 80° C. to 180° C.

In the course of the drying step, the alkoxypolysiloxanes of the invention undergo curing and the treated textiles become impregnated and thereby rendered water-repellent.

The alkoxypolysiloxanes of the invention have the advantage that they provide a very good water-repellent finish on different textiles.

The alkoxypolysiloxanes of the invention have the advantage that the water-repellent finish has a very high durability to washing.

The alkoxypolysiloxanes of the invention have the advantage that they are simple and safe to process.

The alkoxypolysiloxanes of the invention have the advantage that they are obtainable without environmentally persistent pollutants.

Parts and percentages in the examples which follow are by weight, unless otherwise stated. Similarly, unless otherwise stated, the examples which follow are carried out at a pressure of the ambient atmosphere, i.e., at about 1010 hPa, and at room temperature, i.e., about 25° C. or a temperature which becomes established when the reactants are added together at room temperature without additional heating or cooling. Viscosities reported in the examples are all based on temperatures of 25° C.

To determine their structure, $^{29}$Si NMR spectra of the alkoxypolysiloxanes were recorded (AVANCE 400 from Bruker, 10 mm selective $^{29}$Si NMR probe head, pulse angle 90°, delay time 15 s, 400 scans) in CDCl$_3$ containing 0.1 mol/l of Cr(acac)$_3$.

The emulsions obtained in the examples which follow were tested as follows:

The particle size was carried out using a Malvern Mastersizer 2000 (Malvern Instruments GmbH D-Herrenberg; measurement principle: Fraunhofer diffraction in accordance with ISO 13320). As parameter for the measurement, a spherical model is used with a refractive index of 1.33 for the continuous phase, a refractive index of 1.39 for the disperse phase and an absorption of 0.01.

The pH was measured in accordance with US Pharmacopeia USP 33 at 20° C.

The hydrophobicity of the treated textiles is tested via spray testing as per AATCC test method No. 22-2005. In this test, the textiles are spotted with deionized water. The reported result, from comparing the spotted textile surface with the rating pictures in the description of the method, indicates to an approximation the percentage of the area which has remained unwetted.

Preparation Example 1

20 g of a polyorganosiloxane of the formula

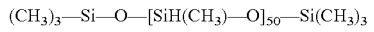

are heated to 70° C. together with 20 g of toluene and 15.2 g of ethanol and admixed over 5 min with a toluene solution of 0.174 g of perfluorotriphenylborane B(C$_6$F$_5$)$_3$. The temperature rises to 100° C. in the course of 3 h, hydrogen being formed to an increased extent starting at 90° C. This is followed by 30 min of stirring. The mixture is exhaustively heated at 1-2 mbar up to a pot temperature of 140° C. to obtain 70 g of a colorless product of the formula (CH$_3$)$_3$—Si—O—[Si(CH$_3$)OEt-O]$_{50}$—Si(CH$_3$)$_3$ (NMR analysis).

Preparation Example 2

Example 1 is repeated except that the starting material used is a polyorganosiloxane of the formula (CH$_3$)$_3$—Si—O—[SiH(CH$_3$)—O]$_{47}$—[Si(CH$_3$)$_2$—O]$_{13}$—Si(CH$_3$)$_3$.

The product obtained is shown by NMR analysis to have the formula (CH$_3$)$_3$—Si—O—[Si(CH$_3$)OEt-O]$_{47}$—[Si(CH$_3$)$_2$—O]$_{13}$—Si(CH$_3$)$_3$.

Preparation Example 3

50 g of a siloxane of the formula (CH$_3$)$_3$—Si—O—[Si(CH$_3$)H—O]$_{54}$—Si(CH$_3$)$_3$ and 0.18 g of a Karstedt catalyst (1% Pt) were heated to 80° C. 101 g of octadecene were gradually admixed in the course of 1 h during which the temperature rose to 120° C. After cooling down to 80° C., 30 g of ethanol were admixed in the course of 75 min during which a considerable evolution of gas and foam was observed. This was followed by stirring at 80° C. for 2 h. Thereafter, volatiles were removed at 100° C. and 10 mbar in a rotary evaporator. On cooling down, the product turned solid and remeltable at 47° C.

NMR analysis showed the product to consist of the following proportions of different siloxane units:

| | |
|---|---|
| (CH$_3$)$_3$—Si—O$_{1/2}$ | 3.4 mol % |
| C$_2$H$_5$O(CH$_3$)$_2$—Si—O$_{1/2}$ | 3.0 mol % |
| SiH(CH$_3$)—O$_{2/2}$ | 0.6 mol % |
| Si(CH$_3$)(C$_{18}$H$_{37}$)—O$_{2/2}$ | 38.8 mol % |
| Si(CH$_3$)(OC$_2$H$_5$)—O$_{2/2}$ | 48.7 mol % |
| CH$_3$—Si—O$_{3/2}$ | 5.5 mol % |

Preparation Example 4

50 g of a siloxane of the formula (CH$_3$)$_3$—Si—O—[Si(CH$_3$)H—O]$_{54}$—Si(CH$_3$)$_3$ and 0.18 g of a Karstedt catalyst (1% Pt) were heated to 40° C.

14 g of methanol were admixed over 60 min and the reaction mixture was stirred at 80° C. for a further 2 h. Then, 101 g of octadecene were gradually admixed in the course of 1 h during which the temperature rose to 115° C. This was followed by stirring at 80° C. for 2 h. After mixture of 0.18 g of catalyst and 14 g of methanol, the reaction mixture was stirred at 80° C. for a further 2 h, then admixed once more with 0.18 g of catalyst and 20 g of octadecene and stirred at 80° C. for a further 2 h. Thereafter, volatiles were removed at 100° C. and 10 mbar in a rotary evaporator. On cooling down, the product turned solid and remeltable at 58° C.

NMR analysis showed the product to consist of the following proportions of different siloxane units:

| | |
|---|---|
| (CH$_3$)$_3$—Si—O$_{1/2}$ | 3.6 mol % |
| CH$_3$O(CH$_3$)$_2$—Si—O$_{1/2}$ | 4.5 mol % |
| SiH(CH$_3$)—O$_{2/2}$ | 0.0 mol % |
| Si(CH$_3$)(C$_{18}$H$_{37}$)—O$_{2/2}$ | 58.4 mol % |
| Si(CH$_3$)(OCH$_3$)—O$_{2/2}$ | 28.7 mol % |
| CH$_3$—Si—O$_{3/2}$ | 4.8 mol % |

Preparation Example 5

106 g of a siloxane of the formula (CH$_3$)$_3$—Si—O—[SiH(CH$_3$)—O]$_{47}$—[Si(CH$_3$)$_2$—O]$_{13}$—Si(CH$_3$)$_3$ and 0.18 g of a Karstedt catalyst (1% Pt) were heated to 80° C. 67.3 g of dodecene were gradually admixed in the course of 1 h during which the temperature rose to 120° C. After cooling down to 75° C., 20 g of ethanol were admixed in the course of 30 min during which a considerable evolution of gas and foam was observed. This was followed by stirring at 80° C. for 2 h. This was followed by a further mixture of 0.18 g of catalyst and 40 g of octene and stirring at 80° C. for a further 2 h. Thereafter, volatiles were removed at 100° C. and 10 mbar in a rotary evaporator to obtain a brown oil having a viscosity of 2370 mPas.

NMR analysis showed the product to consist of the following proportions of different siloxane units:

| | |
|---|---|
| (CH$_3$)$_3$—Si—O$_{1/2}$ | 2.2 mol % |
| SiH(CH$_3$)—O$_{2/2}$ | 3.0 mol % |
| Si(CH$_3$)$_2$—O$_{2/2}$ | 20.9 mol % |
| Si(CH$_3$)(C$_{12}$H$_{25}$)—O$_{2/2}$ | 56.8 mol % |
| Si(CH$_3$)(C$_8$H$_{17}$)—O$_{2/2}$ | 9.6 mol % |
| Si(CH$_3$)(OC$_2$H$_5$)—O$_{2/2}$ | 7.5 mol % |

Preparation Example 6

50 g of a siloxane of the formula (CH$_3$)$_3$—Si—O—[Si(CH$_3$)H—O]$_{54}$—Si(CH$_3$)$_3$ and 0.18 g of a Karstedt catalyst (1% Pt) were heated to 80° C. 50.53 g of dodecene were gradually admixed in the course of 80 min during which the temperature rose to 110° C. This was followed by stirring at 80° C. for 2 h. After heating to 90° C., 32 g of n-propanol were admixed in the course of 30 min during which a considerable evolution of gas and foam was observed. This was followed by stirring at 100° C. for 2 h. This was followed by a further mixture of 0.18 g of catalyst and 40 g of octene and stirring at 80° C. for a further 2 h. Thereafter, volatiles were removed at 100° C. and 10 mbar in a rotary evaporator to obtain a brownish oil having a viscosity of 1320 mPas.

NMR analysis showed the product to consist of the following proportions of different siloxane units:

| | |
|---|---|
| (CH$_3$)$_3$—Si—O$_{1/2}$ | 3.9 mol % |
| C$_3$H$_7$O(CH$_3$)$_2$—Si—O$_{1/2}$ | 1.5 mol % |
| SiH (CH$_3$)—O$_{2/2}$ | 0.0 mol % |
| Si(CH$_3$)(C$_{12}$H$_{24}$)—O$_{2/2}$+ | 51.6 mol % |
| Si(CH$_3$)(C$_8$H$_{17}$)—O$_{2/2}$ | 7.1 mol % |
| Si(CH$_3$)(OC$_3$H$_7$)—O$_{2/2}$ | 34.7 mol % |
| CH$_3$—Si—O$_{3/2}$ | 1.2 mol % |

Preparation Example 7

17 g of an ethoxylated isotridecyl alcohol having an HLB value of 13.7 (obtainable as "LUTENSOL® TO 109" from BASF SE D-Ludwigshafen) and 15 g of water were mixed with an ULTRA-TURRAX® T50 at 4000/min. 250 g of a product obtained as described in Example 3 were melted at 70° C., gradually admixed and homogenized at 6000/min to obtain a firm gel-type phase having a yield limit of 4220 Pa. This phase was incrementally diluted with 218 g of water containing 0.45 g of ACTICIDE® MV preservative (available from Thor GmbH Speyer). The emulsion had a particle size of 432 nm (D(50) value of the volume distribution) and survived 28 d of storage at 50° C. without any sign of separation.

Use Examples 1-7

The products of Preparation Examples 1-3 are used to prepare a 4% solution in isopropanol. The pH of these solutions is adjusted to 9.0 with NaOH. The products of Preparation Examples 4-6 are used to prepare a 4% solution in toluene. These solutions are admixed with 0.02% of butyl titanate.

Stripes of popeline gray 65/35 PES/Co are each dipped into these solutions for 2 h, predried in a lab tenter at room temperature in the fume hood and then cured at 150° C. for 10 min.

Ten parts of the product of Preparation Example 7 are diluted with 990 parts of completely iron-free water to form a liquor. The pH of this liquor is adjusted to 9.0 with NaOH. An A4 size piece of popeline gray 65/35 PES/CO is dipped into this liquor. The saturated fabric is squeezed off with a two-roll pad-angle to a wet pickup of 70%, stretched out and dried in the lab tenter at 150° C. for 10 minutes.

The hydrophobicity is tested after 3 days, after 20 days and after a 40° C. wash (Miele Softtronic W 1935 washing machine; Express 20 program; 1 kg of cotton and polyester ballast fabric) The results are summarized in Table 1.

TABLE 1

| Results of tests | | | |
|---|---|---|---|
| Preparation | Spraytest rating | | |
| Example | After 3 days | After 20 days | After 1x wash |
| 1 | 80 | 90 | 70 |
| 2 | 70 | 70 | 50 |
| 3 | 100 | 100 | 100 |
| 4 | 100 | 100 | 90 |
| 5 | 100 | 100 | 90 |
| 6 | 100 | 100 | 90 |
| 7 | 90 | 100 | 80 |

The higher the value in Table 1, the higher the hydrophobicity, i.e., the better the water-repellent finish on the textiles. The textiles treated with the invention alkoxypolysiloxanes of Examples 1-7 display a good to very good water-repellent finish and also a good to very good durability to washing. A particularly good water-repellent finish and durability to washing is achieved with the alkoxypolysiloxane as per Examples 3-7, i.e., with an alkoxypolysiloxane as per formula (II) which in addition to siloxane units having alkoxy groups also contains siloxane units having comparatively long alkyl groups.

What is claimed is:

1. A method for impregnating textiles, comprising impregnating a textile with a composition comprising alkoxypolysiloxane(s) (A) of the formula $$R^1{}_3SiO[SiR^1(OR^2)O]_x[SiR^1{}_2O]_y[SiR^1R^3O]_zSiR^1{}_3 \quad (I)$$

where
R$^1$ each individually is an optionally substituted a C$_1$-C$_7$ hydrocarbon moiety,
R$^2$ each individually is a hydrogen atom or a C$_1$-C$_6$ hydrocarbon moiety,
R$^3$ each individually is a C$_8$-C$_{30}$ hydrocarbon moiety,
x is an integer of from 5 to 100,
y is an integer of from 0 to 50,
z is an integer of from 5 to 100, with the proviso that there are present
x units [SiR$^1$(OR$^2$)O] in amounts of from 30 mol % to 70 mol %,
y units [SiR$^1{}_2$O] in amounts of from 0 mol % to 50 mol %, and
z units [SiR$^1$R$^3$O] in amounts of from 20 mol % to 70 mol %,
all based on the x+y+z sum total of siloxane units.

2. The method of claim 1, wherein y is 0 and z is an integer of not less than 1.

3. The method of claim 1, wherein the alkoxypolysiloxanes have the formula $$R^1{}_3SiO[SiR^1(OR^2)O]_{x'}[SiR^1R^3O]_{z'}SiR^1{}_3 \quad (II)$$

R$^1$, R$^2$ and R$^3$ are each as defined above,
x' is an integer of from 1 to 1,000,
z' is an integer of from 1 to 1,000,
with the proviso that there are present
x' units [SiR$^1$(OR$^2$)O] in amounts of from 10 mol % to 95 mol %, and
z' units [SiR$^1$R$^3$O] in amounts of from 5 mol % to 90 mol %,
all based on the x'+z' sum total of siloxane units.

4. The method of claim 1, wherein the alkoxypolysiloxanes present have the formula $$R^1{}_3SiO[SiR^1(OR^2)O]_{x'}[SiR^1R^3O]_{z'}SiR^1{}_3 \quad (II)$$

R$^1$, R$^2$ and R$^3$ are each as defined above,
x' is an integer of from 5 to 100,
z' is an integer of from 5 to 100,
with the proviso that there are present
x' units [SiR$^1$(OR$^2$)O] in amounts of from 20 mol % to 80 mol %, and
z' units [SiR$^1$R$^3$O] in amounts of from 20 mol % to 80 mol %,
all based on the x'+z' sum total of siloxane units.

5. A method for impregnating textiles, comprising impregnating a textile with a composition comprising alkoxypolysiloxane(s) (A) of the formula $$R^1{}_3SiO[SiR^1(OR^2)O]_x[SiR^1{}_2O]_y[SiR^1R^3O]_zSiR^1{}_3 \quad (I)$$

where
R$^1$ each individually is an optionally substituted a C$_1$-C$_7$ hydrocarbon moiety,
R$^2$ each individually is a hydrogen atom or a C$_1$-C$_6$ hydrocarbon moiety,
R$^3$ each individually is a C$_8$-C$_{30}$ hydrocarbon moiety,
x is an integer of from 1 to 1,000,
y is an integer of from 0 to 100,
z is an integer of from 0 to 1,000, with the proviso that there are present
x units [SiR$^1$(OR$^2$)O] in amounts of not less than 10 mol %, and not more than 100 mol %
y units [SiR$^1{}_2$O] in amounts of 0 mol % to 90 mol %, and
z units [SiR$^1$R$^3$O] in amounts of 0 mol % to 90 mol %,
all based on the x+y+z sum total of siloxane units, wherein the composition comprises solutions of alkoxypolysiloxanes (A) in organic solvents.

6. A composition comprising at least one alkoxypolysiloxane (A) of the formula $$R^1_3SiO[SiR^1(OR^2)O]_{x'}[SiR^1R^3O]_{z'}SiR^1_3 \quad (II)$$

$R^1$ each individually is an optionally substituted a $C_1$-$C_7$ hydrocarbon moiety,
$R^2$ each individually is a hydrogen atom or a $C_1$-$C_6$ hydrocarbon moiety,
$R^3$ each individually is a $C_8$-$C_{30}$ hydrocarbon moiety,
x' is an integer of from 1 to 1,000,
z' is an integer of from 1 to 1,000,
with the proviso that
x' units [SiR$^1$(OR$^2$)O] are present in amounts of from 10 mol % to 95 mol %, and
z' units [SiR$^1$R$^3$O] are present in amounts of from 5 mol % to 90 mol %,
all based on the x'+z' sum total of siloxane units, wherein the composition is an aqueous emulsion comprising an alkoxypolysiloxane (A),
an emulsifier (B), and
water (C).

* * * * *